(12) United States Patent
Grooms et al.

(10) Patent No.: US 8,196,800 B2
(45) Date of Patent: Jun. 12, 2012

(54) FRICTION WELD VIBRATION QUALITY MONITORING SYSTEM AND METHODS

(75) Inventors: James Grooms, Fairfield Township, OH (US); Charles William Carrier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/241,409

(22) Filed: Sep. 23, 2011

(65) Prior Publication Data

US 2012/0012241 A1    Jan. 19, 2012

Related U.S. Application Data

(62) Division of application No. 12/347,064, filed on Dec. 31, 2008.

(51) Int. Cl.
    B23K 20/12      (2006.01)
    B29C 65/06      (2006.01)
(52) U.S. Cl. ............... 228/102; 228/103; 228/112.1; 156/73.5
(58) Field of Classification Search ............... None
See application file for complete search history.

(56) References Cited

U.S. PATENT DOCUMENTS

| | | | |
|---|---|---|---|
| 3,337,108 A | 8/1967 | Taylor | |
| 3,462,826 A * | 8/1969 | Oberle et al. | 228/102 |
| 3,678,566 A * | 7/1972 | Ellis et al. | 228/102 |
| 3,693,158 A * | 9/1972 | Uthe | 340/679 |
| 3,888,405 A * | 6/1975 | Jones et al. | 228/2.3 |
| 3,954,215 A * | 5/1976 | Takagi et al. | 228/2.3 |
| 4,060,190 A | 11/1977 | Paolini | |
| 4,067,490 A * | 1/1978 | Jones et al. | 228/102 |
| 4,936,502 A * | 6/1990 | Schlarb et al. | 228/102 |
| 5,411,195 A * | 5/1995 | Yamazaki et al. | 228/1.1 |
| 5,858,142 A * | 1/1999 | Tully et al. | 156/73.5 |
| 5,987,367 A | 11/1999 | Ohsaku et al. | |
| 8,070,039 B1 * | 12/2011 | Johnson et al. | 228/2.1 |
| 2005/0218192 A1 * | 10/2005 | Lovin et al. | 228/113 |
| 2005/0231140 A1 * | 10/2005 | Kataoka | 318/114 |
| 2006/0188966 A1 * | 8/2006 | DeAngelis | 435/85 |
| 2006/0196916 A1 * | 9/2006 | Goldstein et al. | 228/114.5 |
| 2010/0280646 A1 * | 11/2010 | Hesse et al. | 700/110 |

FOREIGN PATENT DOCUMENTS

| | | |
|---|---|---|
| GB | 1459126 | 12/1976 |
| GB | 2257077 A | 1/1993 |
| JP | 06000662 | 1/1994 |
| JP | 11099918 A | 4/1999 |

\* cited by examiner

*Primary Examiner* — Kiley Stoner
(74) *Attorney, Agent, or Firm* — McNees Wallace & Nurick LLC

(57) ABSTRACT

Friction welding systems and methods including a welding arrangement configured to impart kinetic friction between at least one surface of a first workpiece and at least one surface of a second workpiece to form a weld, a force providing mechanism arranged and disposed for applying a force to one or both of the first workpiece and the second workpiece, and a sensor arranged and disposed to measure a parameter of the welding arrangement, wherein an amount of vibration is determinable from the measured parameter.

17 Claims, 3 Drawing Sheets

FRICTION WELD VIBRATION QUALITY MONITORING SYSTEM AND METHODS

CROSS-REFERENCE TO RELATED APPLICATIONS

This application relates to and claims the benefit of U.S. patent application Ser. No. 12/347,064, filed Dec. 31, 2008, entitled "Friction Weld Vibration Quality Monitoring System," currently pending, the disclosure of which is incorporated by reference as if fully rewritten herein.

FIELD

The present disclosure is directed to a system and method for friction welding. In particular, the present disclosure relates to monitoring vibration during friction welding.

BACKGROUND

A friction welding system, specifically an inertia or inertial welding system, utilizes friction between surfaces to be joined to produce heat that bonds a first workpiece and a second workpiece together. The two workpieces to be bonded are mounted on an inertial welding machine. In one type of system, the first workpiece is held stationary, while the second workpiece is rotated rapidly on a spindle attached to a fly wheel. When the fly wheel reaches a predetermined speed, the fly wheel is disengaged and pressure is applied to the first workpiece to urge the first workpiece against the second workpiece. Kinetic friction between the first workpiece and the second workpiece generates heat sufficient to form a bond between the first workpiece and the second workpiece.

The first workpiece may be urged against the second workpiece with pressure applied with hydraulic cylinders or similar arrangements. Operation of the inertial welding machine may result in vibration. This vibration can correlate to energy diverted from the bond of the first workpiece and the second workpiece. This vibration energy is diverted to other areas of the workpieces and tooling. The vibration energy can cause damage to the worpieces and tooling that can be identified by inspection after the weld process is complete. Such inspection adds complexity and cost to the process. The vibration can be reduced or eliminated by damping. However, systems and equipment for damping are expensive and are not fully reliable.

What is needed is a friction welding system and method that can prevent vibration while the first piece is forced against the second piece.

SUMMARY OF THE DISCLOSURE

In an exemplary embodiment, a friction welding system includes a welding arrangement configured to impart kinetic friction between at least one surface of a first workpiece and at least one surface of a second workpiece to form a weld, a force providing mechanism arranged and disposed for applying a force to one or both of the first workpiece and the second workpiece, and a sensor arranged and disposed to measure a parameter of the welding arrangement, wherein an amount of vibration is determinable from the measured parameter.

In another exemplary embodiment, a friction welding system includes a welding arrangement configured to impart kinetic friction between at least one surface of a first workpiece and at least one surface of a second workpiece to form a weld, a force providing mechanism arranged and disposed to provide a force to one or both of the first workpiece and the second workpiece, a sensor arranged and disposed to measure a parameter of the welding arrangement, wherein an amount of vibration is determinable from the measured parameter, a controller configured to adjust the force provided by the force providing mechanism in response to the measured parameter, and a pressure circuit in fluid communication with the welding arrangement. In this embodiment, the sensor is configured to measure the vibration of the welding arrangement, and the controller is further configured to adjust the force provided by the force providing mechanism by providing pressure pulses or variation in the pressure circuit based upon the measured parameter.

In another exemplary embodiment, a process of friction welding includes providing a friction welding system, monitoring the force applied by a force providing mechanism, determining the amount of vibration in response to a measured parameter, comparing an amount of vibration to a predetermined amount of vibration, and generating a signal in response to the amount of vibration. In the embodiment, the friction welding system includes a welding arrangement configured to impart kinetic friction between at least one surface of a first workpiece and at least one surface of a second workpiece to form a weld, the force providing mechanism arranged and disposed for applying the force to one or both of the first workpiece and the second workpiece, and a sensor arranged and disposed to measure the parameter of the welding arrangement, wherein the amount of vibration is determinable from the measured parameter.

One advantage of the present disclosure includes reduction or elimination of expensive processing and equipment of friction welded articles.

Another advantage of the present disclosure includes reduction or elimination of the need for expensive and unreliable equipment for vibration damping.

Another advantage of the present disclosure is improved weld quality and improved process control allowing for greater process efficiency.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
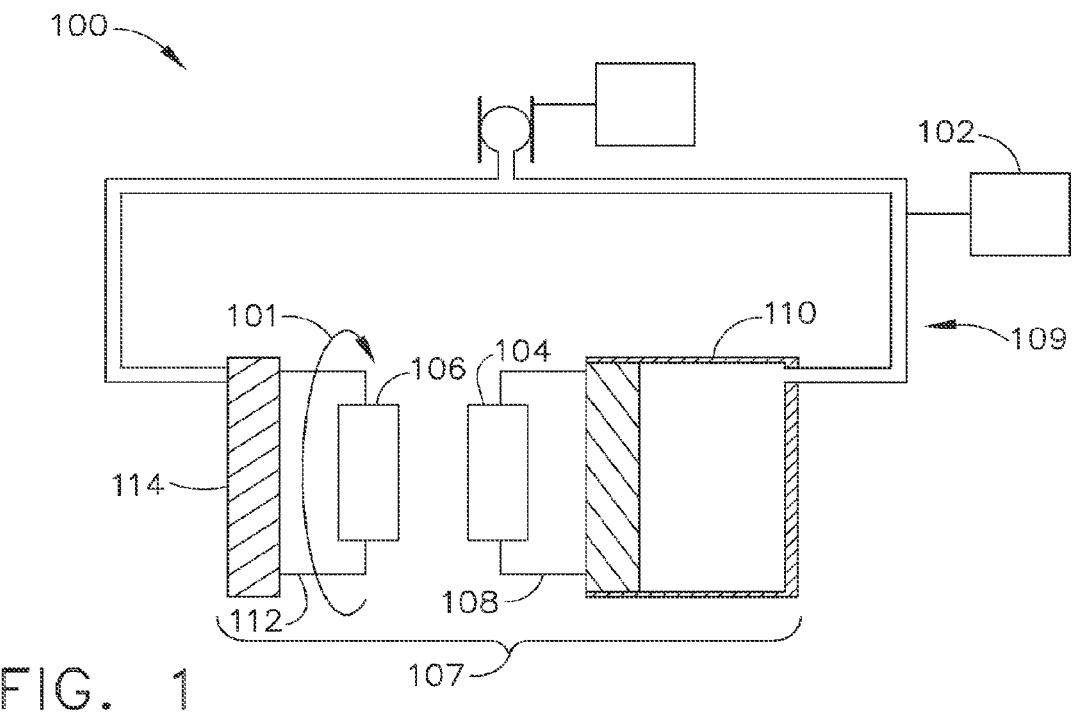
FIG. 1 shows an exemplary embodiment of a friction welding system.

FIG. 1 shows a friction welding system 100. The friction welding system 100 may include an inertial welding arrangement 107, a force providing mechanism 109, and a sensor 102. Inertial welding arrangement 107 is configured to impart a kinetic friction between at least one surface of a first workpiece 104 and at least one surface of a second workpiece 106. Welding arrangement 107 can include a first securing mechanism 108 arranged and disposed for receiving and securing first workpiece 104. As shown, first workpiece 104 is detachably secured by first securing mechanism 108, which prevents rotation of first workpiece 104. First securing mechanism 108 can be attached to or integral with a hydraulic cylinder 110. Welding arrangement 107 can further include a second securing mechanism 112 arranged and disposed to receive and secure second workpiece 106. As shown, second workpiece 106 can be secured by second securing mechanism 112, while permitting second workpiece 106 to rotate (see 101). In one embodiment, shown in FIGS. 1 and 2, second securing mechanism 112 is attached to a hydraulic bearing 114. However, any suitable arrangement may be used to facilitate rotation, including an integral bearing assembly.

Figure 2:
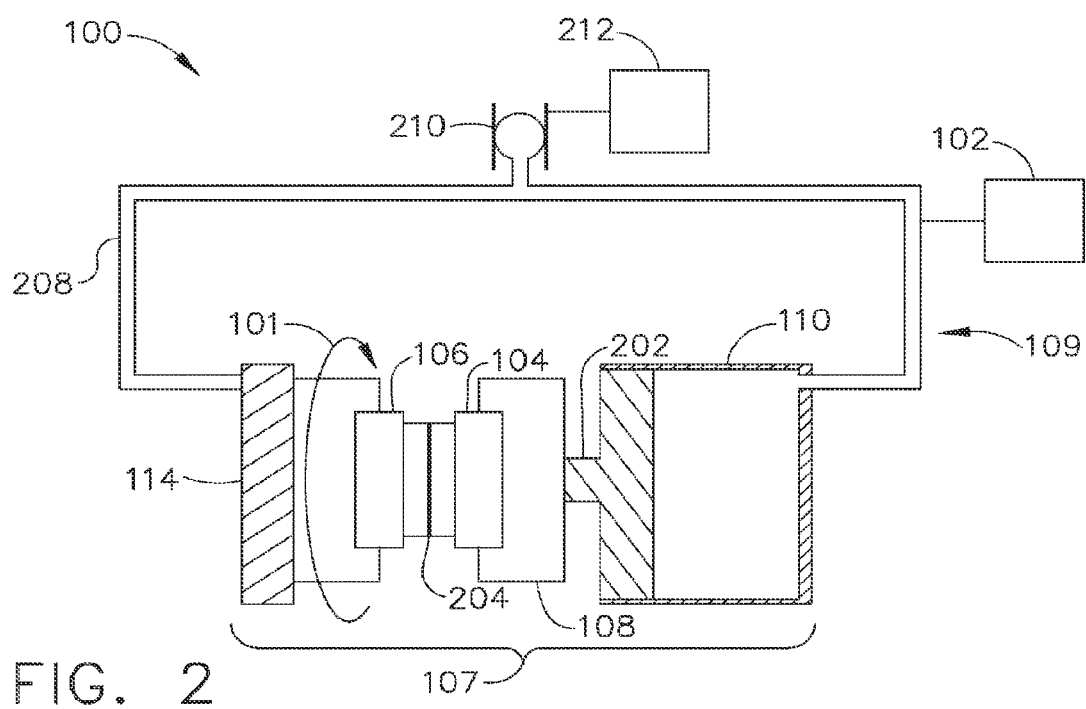
FIG. 2 shows another exemplary embodiment of a friction welding system.

Referring to FIG. 2, force providing mechanism 109 of friction welding system 100 can provide a force to one or both of first workpiece 104 and second workpiece 106. Force providing mechanism 109 can include hydraulic cylinder 110 and hydraulic bearing 114. Hydraulic cylinder 110 provides a force by a piston 202 directing first securing mechanism 108, and thus, first workpiece 104 toward second workpiece 106. With hydraulic bearings 114 securing second workpiece 106 while permitting second workpiece 106 to rotate, first workpiece 104 and second workpiece 106 are forced together where the surfaces sliding over each other result in kinetic friction. The kinetic friction generates heat to form a weld 204. The piston 202 applies force to urge first securing mechanism 108 toward second securing mechanism 112 by action of a pressure circuit 208 in fluid communication with hydraulic cylinder 110. In the embodiment shown, pressure circuit 208 may be in fluid communication with hydraulic cylinder 110 and hydraulic bearings 114. Pressure circuit 208 can be arranged and disposed to provide a controllable pressure to at least one of hydraulic cylinder 110 or hydraulic bearings 114. In an exemplary embodiment, pressure circuit 208 may be controlled by a pressure valve 210 configured to control pressure of pressure circuit 208. In other embodiments, additional pressure valves throughout the pressure circuit can be included to provide additional control.

Friction welding system 100 uses rotary motion and pressure to produce heat resulting from kinetic friction to bond first workpiece 104 and second workpiece 106 together. First workpiece 104 and second workpiece 106 are secured in welding arrangement 107. As shown in FIG. 1, welding arrangement 107 provides rotary motion of second workpiece 106. Rotary motion may be provided by any suitable mechanism including a flywheel on spindle arrangement as is known in the art for intertial welding. Kinetic friction between first workpiece 104 and the second workpiece 106 generates heat sufficient to form a bond between first workpiece 104 and second workpiece 106.

While first workpiece 104 is directed against second workpiece 106 with force provided by force providing mechanism 109, vibration can occur. While not wishing to be bound by theory, vibration is believed to divert energy from a weld 204 formed by the bond between of first workpiece 104 and the second workpiece 106, causing vibration energy to be imparted on other areas of the workpiece and tooling. This energy can cause workpiece and tooling damage. Identifying the damage after fabrication can result in increased expense of producing more scrap, production time, labor and/or equipment (for example, damping).

In an exemplary embodiment, system 100 can include sensor 102 for determining the vibration. Sensor 102 can be arranged and disposed for measuring a parameter relating to force providing mechanism 109 and determining the amount of vibration from the measured parameter. The parameter may include, but is not limited to, fluid pressure; temperature; acoustic response; machine, tooling, or workpiece accelera-tion; and/or machine, tooling or workpiece strain. For example, the vibration can occur on first securing mechanism 108, which can result in vibration of hydraulic cylinder 110. For example, sensor 102 can monitor vibration of hydraulic cylinder 110 by monitoring fluid pressure fluctuations within pressure circuit 208.

In an exemplary embodiment, system 100 can include a controller 212. Controller 212 receives signals from sensor 102 corresponding to the parameter measured by sensor 102. For example, when fluid pressure fluctuations are measured by sensor 102, controller 212 can determine the corresponding vibration and adjust the pressure of pressure circuit 208 in response to the determined vibration. As vibration increases, controller 212 may detect inconsistent pressure demands to provide the desired amount of force, thereby resulting in fluid pressure fluctuations. The detection of the inconsistent pressure demands and the corresponding vibration can thereby provide detection of workpiece damage.

Figure 3:
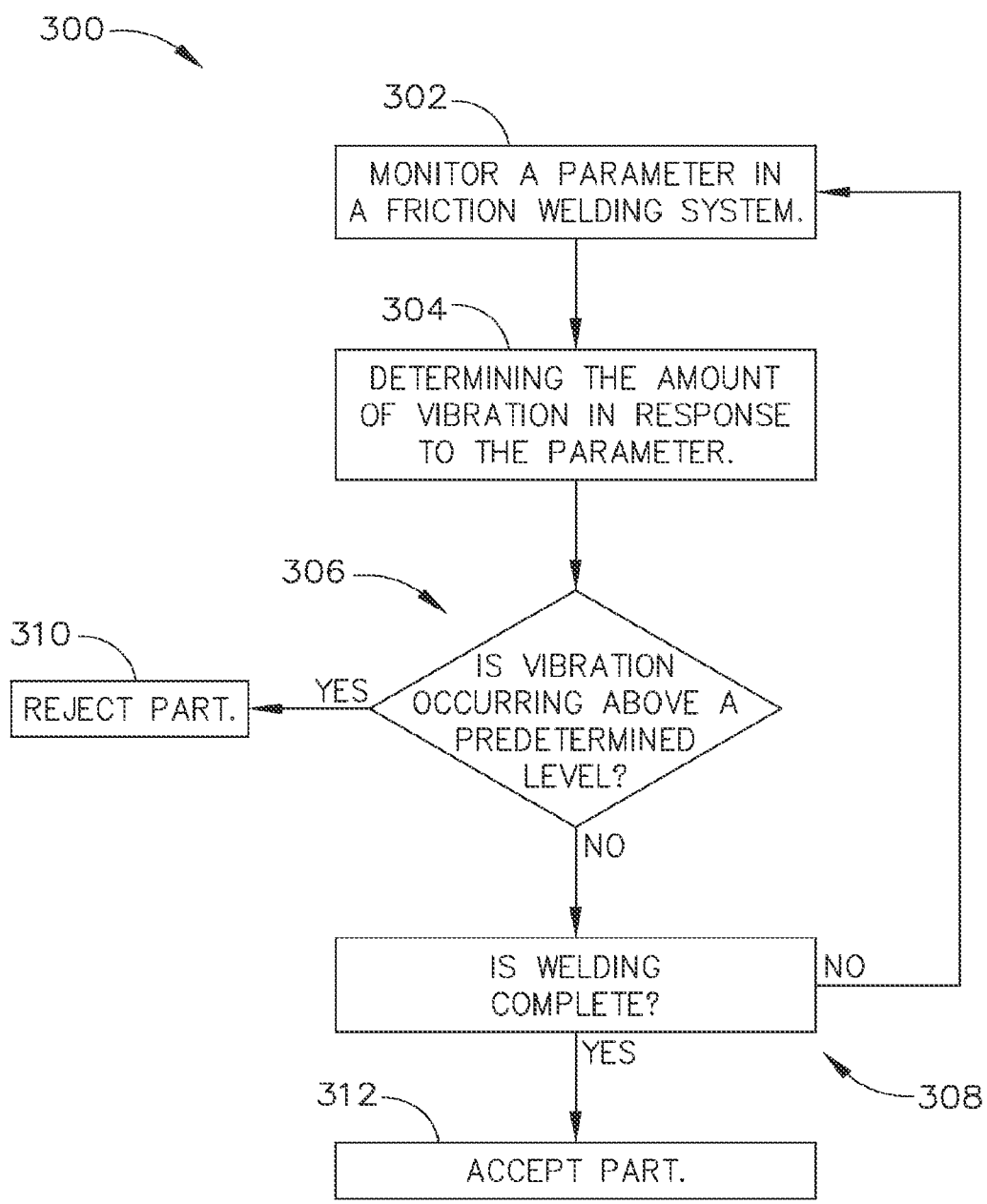
FIG. 3 shows a diagrammatic representation of an exemplary embodiment of a friction welding process.

Referring to FIG. 3, a process 300 for detecting and preventing workpiece damage in a friction welding system is shown. Process 300 includes monitoring a parameter in a friction welding system (step 302). For example, the monitoring may include measuring or sensing, with a sensor or other suitable device, the fluid pressure within a pressure circuit. Process 300 further includes determining the amount of vibration in response to the parameter (step 304). For example, determining the amount of vibration based upon high frequency (such as, 200 khz) fluid pressure data from a pressure circuit. Such determining may include transmission of signals or information from a sensor to a microprocessor or other suitable device. Process 300 further includes comparing the amount of vibration to a predetermined amount of vibration (step 306) and generating a signal in response to the determination. For example, fluid pressure data can be used to automatically calculate whether the amount of vibration is above the predetermined level. Upon determining that the amount of vibration is above the predetermined level (for example, "Yes" in FIG. 3), the signal can be transmitted resulting in a rejection of the part (step 310). Upon determining that the amount of vibration is below the predetermined level (for example, "No" in FIG. 3), the signal can be transmitted resulting in process 300 determining whether welding of the part is complete (step 308). If welding of the part is complete (for example, "Yes" in FIG. 3), then the part can be accepted (step 312). If welding of the part is not complete (for example, "No" in FIG. 3), then the process can be repeated (step 302).

Figure 4:
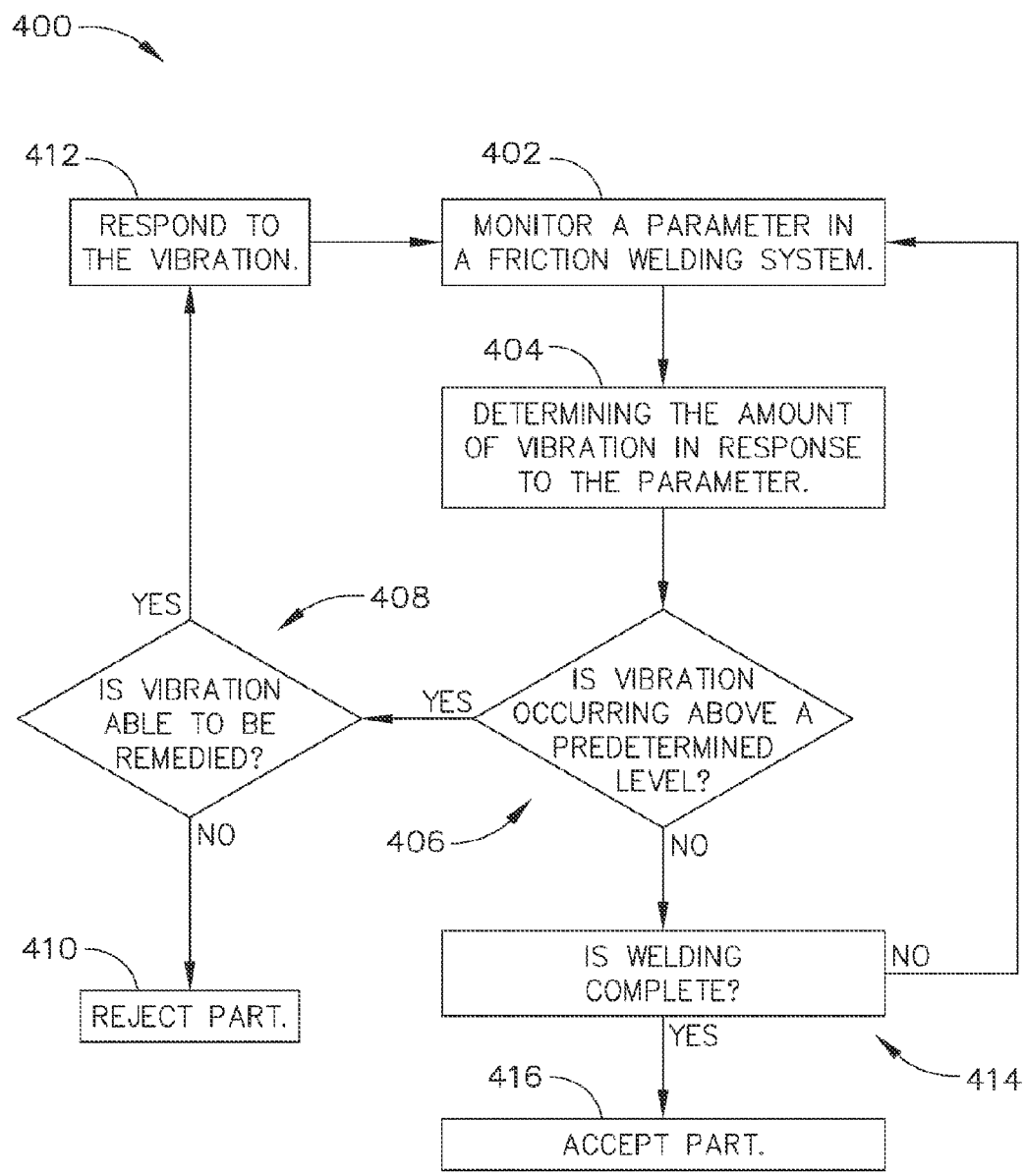
FIG. 4 shows another diagrammatic representation of an exemplary embodiment of a friction welding process.

Referring to FIG. 4, a process 400 for detecting and preventing workpiece damage in a friction welding system is shown. Process 400 includes monitoring a parameter in a friction welding system (step 402). For example, monitoring the fluid pressure provided to a hydraulic cylinder acting upon a first securing mechanism, and thus, urging the first workpiece toward a second workpiece. Process 400 further includes determining the amount of vibration in response to the parameter (step 404). For example, determining the amount of vibration based upon high frequency (such as, 200 khz) pressure data from a pressure circuit. Process 400 further includes comparing the amount of vibration to a predetermined amount of vibration (step 406) and generating a signal in response to the determination. For example, the pressure data can be used to automatically calculate whether the amount of vibration is above a predetermined level.

Upon determining that vibration is above the predetermined level (for example, "Yes" in FIG. 4), the signal can be transmitted resulting in process 400 determining whether vibration may be remedied (step 408). The determination of whether vibration may be remedied can include comparing process limits based upon pressure data from the system, comparing process limits based upon preprogrammed specifications, consideration of the amount of times the process has attempted to remedy the vibration, and/or other suitable conditions. If the system determines vibration cannot be remedied (for example, "No" in FIG. 4), the part is rejected (step 410). If the system determines vibration can be remedied (for example, "Yes" in FIG. 4), then the system responds to the vibration (step 412) and the process is repeated (step 402). For example, a signal controller can provide a signal in response to the amount of vibration. The response can include pressure pulses in the pressure circuit to stabilize a hydraulic cylinder and the process can be repeated to determine whether the pressure pulses stabilized the hydraulic cylinder.

In comparing the amount of vibration to a predetermined amount of vibration (step 406), upon determining that the amount of vibration is below the predetermined level (for example, "No" in FIG. 4), the system can determine whether welding of the part is complete (step 414). If welding of the part is complete (for example, "Yes" in FIG. 4), then the part can be accepted (step 416). If welding of the part is not complete (for example, "No" in FIG. 4), then the process can be repeated (step 402).

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of friction welding comprising:
    providing a friction welding system including:
        a welding arrangement configured to impart kinetic friction between at least one surface of a first workpiece and at least one surface of a second workpiece to form a weld;
        a force providing mechanism arranged and disposed for applying a force to one or both of the first workpiece and the second workpiece; and
        a sensor arranged and disposed to measure a fluid pressure fluctuation of the welding arrangement, wherein an amount of vibration for a parameter of the friction welding system is determinable from the measured fluid pressure fluctuation;
    monitoring the force applied by the force providing mechanism;
    determining the amount of vibration for the parameter in response to the measured fluid pressure fluctuation;
    comparing the amount of vibration to a predetermined amount of vibration;
    generating a signal in response to the amount of vibration if the amount of vibration is greater than the predetermined amount of vibration for the parameter, and returning to the step of monitoring if no signal is generated;
    determining if the amount vibration can be remedied; and
    sending a signal to the force providing mechanism, wherein the force providing mechanism adjusts in response to the signal to reduce the force urging the first workpiece and the second workpiece together if the amount of vibration can be remedied or the force providing mechanism stops in response to the signal if the amount of vibration cannot be remedied.

2. The method of claim 1, wherein the parameter of the friction welding system is strain of tooling, strain of first and second workpieces, acceleration of tooling, acceleration of first and second workpieces, and combinations thereof.

3. The method of claim 1, wherein the fluid pressure fluctuation is frequency fluid pressure data from a pressure circuit, the pressure circuit being in fluid communication with at least one of a first securing mechanism arranged and disposed to receive and secure the first workpiece or a second securing mechanism arranged and disposed to receive and secure the second workpiece, the second securing mechanism being configured to rotate the second workpiece.

4. The method of claim 3, further comprising providing a plurality of fluid pressure pulses in the pressure circuit in response to the generated signal.

5. The method of claim 1, further comprising accepting or rejecting the weld formed between the first workpiece and the second workpiece in response to the generated signal.

6. The method of claim 1, wherein determining whether the vibration can be remedied includes performing calculations from data selected from the group consisting of pressure data, a preprogrammed specification, an amount of time the system has tried to remedy the vibration, and combinations thereof.

7. A method of friction welding comprising:
    providing a friction welding system comprising:
        a welding arrangement configured to impart kinetic friction between at least one surface of a first workpiece and at least one surface of a second workpiece to form a weld;
        a force providing mechanism arranged and disposed for applying an amount of force to one or both of the first workpiece and the second workpiece;
        a sensor arranged and disposed to measure a fluid fluctuation of the welding arrangement, wherein an amount of vibration of a parameter is determinable from the fluid fluctuation; and
        a controller configured to adjust the force provided by the force providing mechanism in response to the measured fluid fluctuation, wherein the controller is configured to adjust the force provided by the force providing mechanism by providing pressure pulses or variation in the pressure circuit based upon the measured fluid fluctuations, the parameter and the signal;
    monitoring the amount of force applied by the force providing mechanism;
    determining the amount of vibration in response to the measured fluid fluctuations;
    comparing the amount of vibration to a predetermined amount of vibration;
    generating a signal when the amount of vibration determined for the measured fluid fluctuation is greater than the predetermined amount of vibration for the parameter;
    determining if the amount vibration can be remedied; and
    sending a signal to the force providing mechanism, wherein the force providing mechanism urges the first workpiece and the second workpiece together in response to the signal to reduce the amount of force urging the first workpiece and the second workpiece together if the amount of vibration can be remedied or the force providing mechanism stops in response to the signal if the amount of vibration cannot be remedied.

8. The method of claim 7, wherein the measured fluid fluctuation is fluid pressure.

9. The method of claim 7, wherein the measured fluid fluctuation is frequency fluid pressure data from a pressure circuit, the pressure circuit being in fluid communication with at least one of the first securing mechanism or the second securing mechanism.

10. The method of claim 7, wherein the parameter is selected from the group consisting of acoustic response, tooling acceleration, and workpiece acceleration.

11. The method of claim 7, wherein the amount of the vibration is based upon high frequency fluid pressure data from a pressure circuit.

12. The method of claim 7, wherein the amount of the force applied remedies the vibration.

13. The method of claim 7, wherein the amount of the force applied is repeatedly adjusted in response to the amount of the increasing vibration.

14. The method of claim 7, wherein the amount of the vibration is determined by inconsistent pressure demands.

15. The method of claim 7, wherein the friction welding system prevents the vibration from occurring while the force urges the first workpiece and the second workpiece together.

16. The method of claim 7, wherein the force providing mechanism is stabilized by adjustments of the amount of the force being applied.

17. The method of claim 7, wherein the force providing mechanism is stabilized by applying pressure pulses.

* * * * *